United States Patent
Chen et al.

(10) Patent No.: US 9,443,128 B2
(45) Date of Patent: Sep. 13, 2016

(54) SEGMENTING BIOLOGICAL STRUCTURES FROM MICROSCOPY IMAGES

(71) Applicant: Carnegie Mellon University, Pittsburgh, PA (US)

(72) Inventors: Cheng Chen, Pittsburgh, PA (US); Gustavo Kunde Rohde, Pittsburgh, PA (US); John A. Ozolek, Pittsburgh, PA (US); Wei Wang, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 67 days.

(21) Appl. No.: 14/348,342

(22) PCT Filed: Sep. 27, 2012

(86) PCT No.: PCT/US2012/057504
§ 371 (c)(1),
(2) Date: Mar. 28, 2014

(87) PCT Pub. No.: WO2013/049312
PCT Pub. Date: Apr. 4, 2013

(65) Prior Publication Data
US 2014/0286562 A1 Sep. 25, 2014

Related U.S. Application Data

(60) Provisional application No. 61/626,598, filed on Sep. 29, 2011.

(51) Int. Cl.
*G06K 9/00* (2006.01)
*G06T 7/00* (2006.01)

(52) U.S. Cl.
CPC .......... *G06K 9/0014* (2013.01); *G06T 7/0081* (2013.01); *G06T 2207/10056* (2013.01); *G06T 2207/20081* (2013.01); *G06T 2207/30024* (2013.01)

(58) Field of Classification Search
None
See application file for complete search history.

(56) References Cited

U.S. PATENT DOCUMENTS

| 2007/0173707 A1 | 7/2007 | Mitra |
| 2009/0169118 A1 | 7/2009 | Eichhorn et al. |
| 2010/0266191 A1 | 10/2010 | Kask |
| 2011/0168914 A1 | 7/2011 | Haisch et al. |

FOREIGN PATENT DOCUMENTS

| KR | 10-2011-0045224 | 5/2011 |
| WO | WO2013/049312 | 4/2013 |

OTHER PUBLICATIONS

International Search Report and Written Opinion in corresponding PCT Application No. PCT/US2012/057504, dated Mar. 29, 2013, pp. 1-9.

*Primary Examiner* — Atiba O Fitzpatrick
(74) *Attorney, Agent, or Firm* — Fish & Richardson P.C.

(57) ABSTRACT

A method performed by one or more processors, includes: receiving an image to be segmented into one or more representations of one or more biological structures; accessing data representing a set of biological structures that are derived from other biological structures delineated in a training image, wherein the training image is associated with a level of modality that corresponds to a level of modality associated with the image to be segmented; computing a normalized cross correlation of the received image against one or more of the biological structures in the set of biological structures; generating, based on computing, seed data representing an estimate of a spatial organization of the one or more biological structures in the received image; and segmenting, based on a normalized cross correction of the received image to the seed data, the received image into the one or more representations of the one or more biological structures.

24 Claims, 7 Drawing Sheets

SEGMENTING BIOLOGICAL STRUCTURES FROM MICROSCOPY IMAGES

CLAIM OF PRIORITY

This application claims priority under 35 U.S.C. §119(e) to provisional U.S. Patent Application No. 61/626,598, filed on Sep. 29, 2011, the entire contents of which are hereby incorporated by reference.

GOVERNMENT RIGHTS

The techniques disclosed herein are made with government support under the National Institutes of Health Number R21GM088816. The government may have certain rights in the techniques disclosed herein.

BACKGROUND

In an example, cell nuclei in microscopy images are segmented. Generally, segmentation includes a separation of data into various portions, with at least one of the separated portions representing a particular structure (e.g., a nucleus, a cell, a tissue, an organ, and so forth). In this example, the data that is segmented may include an image. In this example, segmentation includes the identification of the cell nuclei in the image.

In this example, cell nuclei are segmented from images, e.g., before a feature of the cell nuclei can be quantitatively analyzed and studied for the effects of drugs, genes, and diseases (e.g., cancer). Generally, a feature includes a characteristic of a structure. There are numerous types of features, including, e.g., size, shape, chromatin distribution, location in a cell, and so forth. In another example, organs (e.g., a heart, a brain, and so forth) are segmented from radiology-type images, e.g., to promote analysis of the organs for anomalies.

SUMMARY

In one aspect of the present disclosure, a method performed by one or more processors includes receiving an image to be segmented into one or more representations of one or more biological structures; accessing data representing a set of biological structures that are derived from other biological structures delineated in a training image, wherein the training image is associated with a level of modality that corresponds to a level of modality associated with the image to be segmented; computing a normalized cross correlation of the received image against one or more of the biological structures in the set of biological structures; generating, based on computing, seed data representing an estimate of a spatial organization of the one or more biological structures in the received image; and segmenting, based on a normalized cross correction of the received image to the seed data, the received image into the one or more representations of the one or more biological structures.

Implementations of the disclosure can include one or more of the following features. In some implementations, segmenting includes: using the normalized cross correction of the received image to the seed data to spatially register one or more items of seed data to the one or more biological structures in the received image. In other implementations, generating includes computing quantity $\gamma_p(u)$ in accordance with:

$$\gamma_p(u) = \frac{\sum_x J(x)W_p(x-u)}{\overline{J}(u)\overline{W}_p}.$$

wherein $J(x)$ represents an approximate segmentation of the received image; wherein each biological structure in the set of biological structures is represented as $W_p(x)$, with $p=1,\ldots,K$; wherein $\overline{J}(u)$ represents a sum of squared values of image J under a template positioned at u; wherein $\overline{W}_p$ represent a sum of squared values of a template p; and wherein the method further includes: computing a detection probability image $M(u)$ in accordance with $M(u)=\max_p \gamma(u)$; and identifying the seed data based on identification of pixel locations in detection probability image M that are greater than a threshold $\mu$.

In still other implementations, the received image includes a microscopy image. In some implementations, the one or more biological structures in the received image include one or more of a nucleus, a cell, a tissue, and an organ. In some implementations, the method further includes receiving the training image; and receiving data specifying a delineation of biological structures in the training image.

In other implementations, the method includes generating, based on the delineation, a template representing a biological structure that is derived from features of the delineated biological structures; applying a principal component analysis technique to the template and to variations of the template. In still other implementations, the method includes generating, based on application of the principal component analysis technique, a statistical model of spatial transformations representing possible variations in shape of the delineated biological structures in the training image; and generating, based on application of the statistical model to the delineated biological structures in the received image, the set of biological structures. In some implementations, the one or more biological structures represented in the received image includes at least one of: a nucleus of a U2OS cell; a nucleus of a NIH3T3 cell; and a nucleus of a synthetic cell.

In still another aspect of the disclosure, one or more machine-readable media are configured to store instructions that are executable by one or more processors to perform operations including receiving an image to be segmented into one or more representations of one or more biological structures; accessing data representing a set of biological structures that are derived from other biological structures delineated in a training image, wherein the training image is associated with a level of modality that corresponds to a level of modality associated with the image to be segmented; computing a normalized cross correlation of the received image against one or more of the biological structures in the set of biological structures; generating, based on computing, seed data representing an estimate of a spatial organization of the one or more biological structures in the received image; and segmenting, based on a normalized cross correction of the received image to the seed data, the received image into the one or more representations of the one or more biological structures. Implementations of this aspect of the present disclosure can include one or more of the foregoing features.

In still another aspect of the disclosure, an electronic system includes one or more processors; and one or more machine-readable media configured to store instructions that are executable by the one or more processors to perform operations including: receiving an image to be segmented into one or more representations of one or more biological structures; accessing data representing a set of biological structures that are derived from other biological structures delineated in a training image, wherein the training image is associated with a level of modality that corresponds to a level of modality associated with the image to be segmented; computing a normalized cross correlation of the received image against one or more of the biological structures in the set of biological structures; generating, based on computing, seed data representing an estimate of a spatial organization of the one or more biological structures in the received image; and segmenting, based on a normalized cross correction of the received image to the seed data, the received image into the one or more representations of the one or more biological structures. Implementations of this aspect of the present disclosure can include one or more of the foregoing features.

All or part of the foregoing can be implemented as a computer program product including instructions that are stored on one or more non-transitory machine-readable storage media, and that are executable on one or more processors. All or part of the foregoing can be implemented as an apparatus, method, or electronic system that can include one or more processors and memory to store executable instructions to implement the stated operations.

The details of one or more implementations are set forth in the accompanying drawings and the description below. Other features, objects, and advantages will be apparent from the description and drawings, and from the claims.

DETAILED DESCRIPTION

A system consistent with this disclosure performs segmentation through use of a template. In this example, the system is configured to generate the template using a supervised learning technique. For example, using the template, the system may automatically (or semi-automatically) identify representations of nuclei in various images. The system is configured to perform segmentation of biological structures (e.g., cells and subcellular organelles) in various kinds of microscopy images (e.g., widefield images, confocal images, and so forth). Based on results of segmentation of the images, the system identifies representations of various structures in the images.

In this example, the system is configured to semi-automatically generate the template using training images, in which a user has manually delineated structures that are present in the training images. The template represents a structure that is based on features of the delineated structures. For example, the template may include an average structure of a cell. Using the template, the system may segment an image that is associated with a modality that corresponds to a modality of the template. Generally, a modality includes an association with a predefined pattern or particular group or category. Generally, a correspondence includes a similarity or a match among items of data. In this example, the segmentation is based on a maximization of the normalized cross correlation (NCC) between the template and the image to be segmented. Generally, cross correlation includes a measure of similarity between two items of data, with the measure being in accordance with a standard of measurement.

Figure 1:
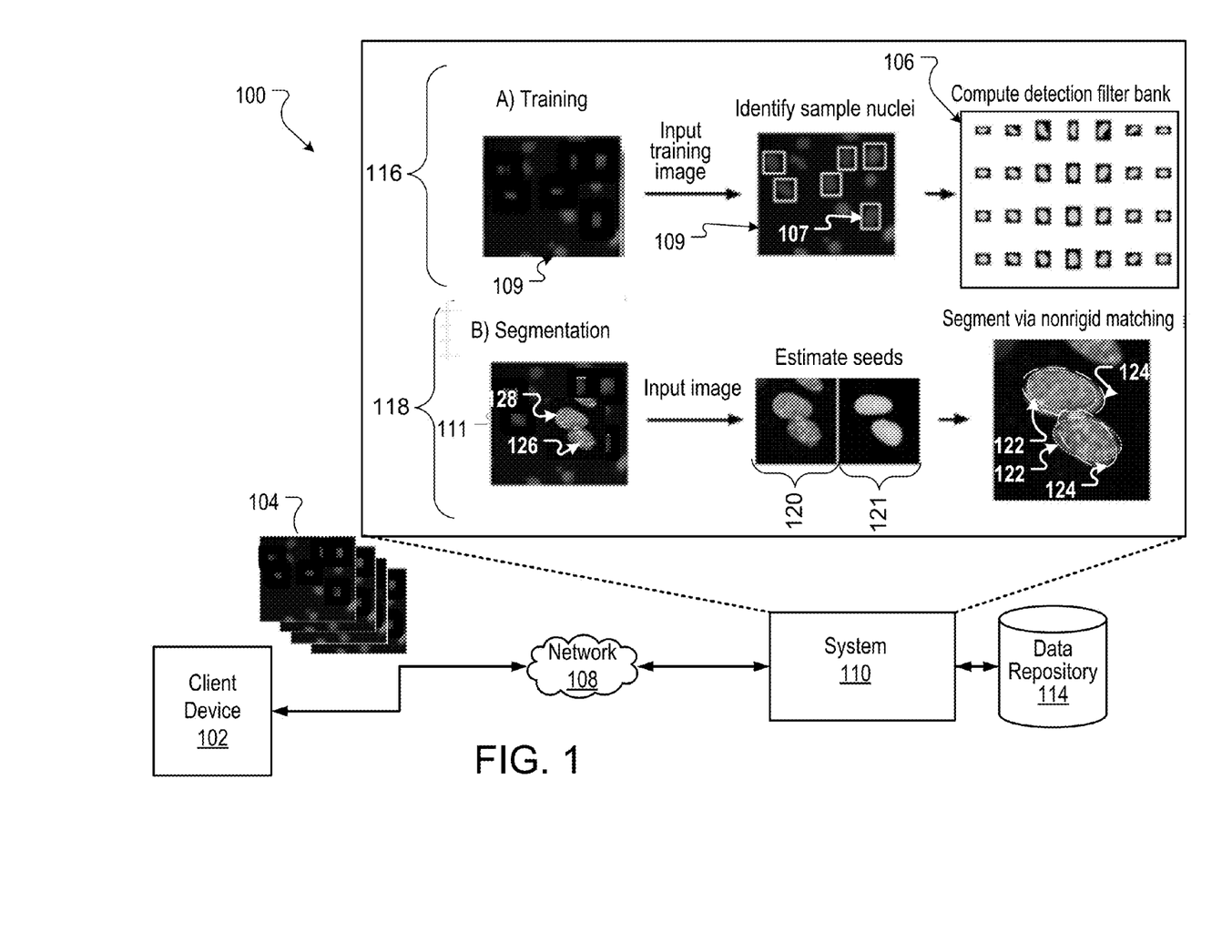
FIG. 1 shows an example of a network environment for segmenting an image with a template.

FIG. 1 is an example of network environment 100 for segmenting an image with a template. The example environment 100 includes network 108, including, e.g., a local area network (LAN), a wide area network (WAN), the Internet, or a combination thereof. Network 108 connects client device 102 and system 110. The example environment 100 may include many thousands of client devices and systems. The example environment 100 also includes data repository 114 for storing numerous items of data, including, e.g., a filter bank 106 and seeds 120, 121, each of which are described in further detail below.

Client device 102 includes a personal computer, a laptop computer, and other devices that can send and receive data over network 108. In the example of FIG. 1, client device 102 sends, to system 110, data set 104. In the example of FIG. 1, data set 104 may include images to be segmented, e.g., by system 110. In this example, client device 102 may include a device operated by an entity that differs from an entity that operates system 110.

In the example of FIG. 1, system 110 performs automated segmentation (e.g., of data set 104) through implementation of training process 116 and segmentation process 118. In training process 116, a user of client device 102 utilizes a graphical user interface to delineate representations of several biological structures of interest (e.g. nuclei, cells, and so forth). As described in further detail below, system 110 uses the delineations in generating a statistical model. In segmentation process 118, system 110 samples the statistical model to identify an approximate segmentation of an input image, including, e.g., input image 111. Using the approximate segmentation, system 110 produces a segmentation of input image 111 based on implementation of a non-rigid matching technique. Training process 116 and segmentation process 118 are described in further detail below.

During training process 116, system 110 implements a supervised learning algorithm to generate a template from the delineation of structures in training image 109. In an example, a supervised learning technique includes a machine learning task of inferring a function from supervised (e.g., labelled) training data. The training data include a set of training examples. In supervised learning, each example is a pair includes an input object (e.g., a vector) and a desired output value (e.g., a supervisory signal). A supervised learning algorithm analyzes the training data and produces an inferred function. There are various types of supervised learning algorithms, including, e.g., an artificial neural network, a naive bayes classifier, a nearest neighbor algorithm, and so forth. The supervised learning algorithm implemented by system 110 is described in further detail below.

In training process 116, system 110 selects an item of data from data set 104. In this example, the selected item of data is training image 109. Training image 109 is displayed for a user of client device 102, e.g., for the user to manually delineate which portions of training image 109 represent a structure. In the example of FIG. 1, the user isolates several structures in training image 109, e.g., through delineations (e.g., delineation 107) that identify the several structures. In the example of FIG. 1, the delineations include rectangular image sub-windows that each includes an image of a structure.

In this example, system 110 provides the user with instructions that each sub-window (e.g., delineation 107) include one image of a structure and that the set of sub-windows include various types of structures and various features of the structures. In this example, the varied features may include various shapes (e.g., small, large, bent, irregular shaped, and so forth). In the example of FIG. 1, training image 109 includes a set of N rectangular sub-windows, which can be of different sizes. To promote uniformity in the size of the rectangular sub-windows, system 110 adds additional data (e.g., a binary string of zeros) to an image of a structure included in the rectangular sub-windows, e.g., to render each sub-window of the same size (in terms of number of pixels in each dimension) as the largest rectangular sub-window in the set.

System 110 also rigidly aligns the set of sub-windows to one image from the set (e.g., picked at random). In this example, system 110 selects the normalized cross correlation of the set of sub-windows as the optimization criteria to be used in the rigid alignment procedure. The rigid alignment procedure consists of searching for the spatial transformations (translations and rotations) that "best match" the images being registered. The "best match" is computed through a maximization of the cross correlation between the images' intensity values. The spatial transformation is searched iteratively, using the identity transform as the starting point, via the steepest ascent method. System 110 also includes coordinate inversions of the images in the set of sub-windows in the optimization criteria.

Using the set of N rigidly aligned sub-windows that include images $I_1, \ldots, I_N$, system 110 generates a template for images $I_1, \ldots, I_N$. In an example, the template represents an average shape and texture of the images in the set. In this example, system 110 generates the template from example images of structures manually isolated by the user, e.g., through delineation 107 in training image 109. To generate the template, system 110 implements an averaging procedure that includes taking the several windows each including one image of a structure (e.g., nucleus) and registering the images non-rigidly to find an average spatial configuration among the structures. System 110 then averages the pixel intensities of the images included in the set and uses the resultant pixel intensity as the pixel intensity of the template.

In an example, system 110 implements non-rigid registration for two images, namely, T(x) and S(x). In this example, system 110 matches T(x) and S(x) such that $T(x) \approx S_u(x) = S(x-u(x))$. In this example, system 110 maximizes the square of the multi-channel (e.g., NCC) between the two images in accordance with the following formula:

$$\Phi(u) = \frac{1}{3} \sum_{j=1}^{N_{ch}} \left( \frac{\langle S_u^j, T^j \rangle}{\|S_u^j\|^2 \|T^j\|^2} \right)^2.$$

In this example, $\|T\|2 = \langle T, T \rangle = \Sigma_x T(x) T(x)$. The foregoing formula is maximized via a steepest gradient ascent. The gradient at each pixel location is given by the following formula:

$$\nabla_u \Phi(u^k; x) = \frac{2}{3} \sum_{j=1}^{N_{ch}} \frac{\langle S_u^j, T^j \rangle}{\|S_u^j\|^4 \|T^j\|^2} \times (\langle S_u^j, T^j \rangle S_u^j(x) - \|S_u^j\|^2 T(x)) \nabla S_u^j(x)$$

In order to regularize the evolution equation, system 110 convolves $\nabla_u \Phi(u, x)$ with a radially symmetric Gaussian kernel of variance $\sigma^2$. Optimization is conducted iteratively starting with $u^0(x) = 0$, and $u^{k+1}(x) = u^k + \kappa G_\sigma(x) * \nabla_u \Phi(u^k; x)$, where $G_\sigma$ is the Gaussian kernel, * represents the digital convolution operation, and $\kappa$ is a small step size. Optimization continues until the increase in the NCC value falls below a chosen threshold. System 110 also utilizes a multi-scale strategy wherein the problem is initially solved at a coarse image scale, and the solution is used as an initialization at a finer scale.

System 110 is configured to implement numerous averaging procedures in generating the template. In an example, the averaging procedure depends on the computation of a non-rigid registration that aligns two images $I_i$, and $I_j$, via $I_i(T_i(x)) \sim I_j(x)$, with x being an input coordinate in the image grid $\Omega$, and $T_j(x): \Omega \rightarrow R^2$.

In this example, system 110 computes a non-rigid registration of the images in the set, e.g., using a maximization of a normalized cross correlation cost function. In generating the template, system 110 selects an image from the set at random and specifies the selection of the image as $I_0^k(x)$. In generating the template, system 110 performs the following actions. In a first action, starting with k=1, system 110 non-rigidly registers $I_0^k$ to each training image patch $I_i$, i=1, 2, ..., N such that $I_i(T_i(x)) \approx I_0^k(x)$. In a second action, system 110 calculates a temporary average template $\Psi(x) = I_0^k((T^{-1}(x))$, with $$\bar{T} = \frac{1}{N} \sum_{i=1}^{N} T_i,$$

and $T^{-1}$ the inverse of the transformation function. In a third action, system 110 also computes the average texture on the same average template above by registering each image in the set to $\Psi(x)$ (i.e. $I_i(T'(x)) \approx \Psi(x)$), and updates the template via $$I_0^{k+1}(x) = \frac{1}{N} \sum_{i=1}^{N} I_i(T'(x)).$$

In a fourth action, system 110 also computes an error in accordance with the following formula: error=$\|I_0^k+1-I_0^k\|^2$ (e.g., sum of squared errors). If system 110 detects an error $< \epsilon$, system 110 is configured to stop generation of the template. If system does not detect an error <ϵ, system 110 sets k=k+1 and proceeds to repeat the first through fourth actions.

Following completion of the foregoing actions, system 110 generates an image that represents a template (e.g., both in shape and texture) of the images that were delineated in training image 109. System 110 also generates a set of spatial transformations that map each image that were delineated in training image 109 to the template in accordance with the following formula: $I_i(T_i(x)) \approx I_o(x)$, i=1, ..., N.

As part of training process 116, system 110 also computes filter bank 106. Filter bank 106 includes a set of images that are derived from the images selected in training image 109. In generating filter bank 106, system 110 samples the template and variations of the template to produce the set of images that are included in filter bank 106.

In generating filter bank 106, system 110 implements the following techniques. In an example, system 110 applies a principal component analysis (PCA) technique to the template and variations of the template. Based on application of the PCA technique, system 110 derives a statistical model of spatial transformations representing possible variations in the shape of the sample nuclei that were marked in training image 109. System 110 uses the statistic model in generating filter bank 106. In the statistical model, a spatial transformation is encoded as a vector (i.e., v) of displacements in accordance with the following formula: $v_i = [T_i(x_1), \ldots, T_i(x_M)]^T$, with M representing the number of pixels in an image. In this example, system 110 computes the mean and the covariance of the set of spatial displacements $v_1, \ldots, v_N$ in accordance with the formulas shown in the below Table 1.

TABLE 1

$$\bar{v} = \frac{1}{N} \sum_{i=1}^{N} v_i$$

$$C = \frac{1}{N} \sum_{i=1}^{N} (v_i - \bar{v})(v_i - \bar{v})^T$$

In the PCA technique, the principal deformation modes are given by the eigenvectors $q_p$, p=1, 2, 3 ... n of the covariance $Cq_p = \lambda_p q_p$. System 110 generates the statistical model for the variation in shape (e.g., of the images selected in training image 109) by retaining eigenvalues and eigenvectors corresponding to a predefined amount (e.g., 95%) of the variance in the set of images selected from training image 109. In this example, system 110 evaluates the statistical model by selecting an eigenvector and calculating $v_{p,b} = \bar{v} + bq_p$. System 110 generates the template, at least in part, by reassembling $v_{p,b}$ into a corresponding spatial transformation $T_{p,b}$, and computing $I_0(T_{p,b}(x))$.

System 110 evaluates the statistical model for $b \in [-3\lambda_k, 3\lambda_k]$, in intervals of $\lambda$. Using results of the evaluation, system 110 generates an initial set of images representing likely nuclear configurations. In an example, the initial set of images is included in filter bank 106. Additionally, system 110 may augment the initial set of images by including in filter bank 106 additional images that represent rotations of one or more images in the initial set. System 110 may also augment the initial set of images by including in filter bank 106 additional images that represent variations in size of one or more images in the initial set. In this example, system 110 uses the set of images in filter bank 106 in segmenting another image (e.g., input image 111) in data set 104, as described in further detail below.

Following generation of filter bank 106, system 110 implements segmentation process 118. In this example, the images in filter bank 106 represent different filters. For an image from which a specified type of structure is to be segmented, system 110 computes the normalized cross correlation between each filter and the image. System 110 selects the pixels for which the normalized cross correlation falls above an input threshold. The selected pixels are seed data for use segmenting an image from data set 104. Generally, seed data includes an item of data used in deriving values for other items of data. The seed data represents an estimate of the spatial organization of structures in the image to be segmented. Seed data is hereinafter referred to as "seeds," without limitation, and for purposes of convenience.

In this example, system 110 uses filter bank 106 and an input image in generating seeds 120, 121. In this example, input image 111 includes an image to be segmented, e.g., to identify structures in the image. Input image 111 may be an image from data set 104. Input image 111 may also be another image (e.g., retrieved from data repository 114 or from another device) that has a threshold amount of modality to training image 109. In generating seeds 120, 121, system 110 implements a segmentation algorithm, e.g., a series of instructions for increasing the normalized cross correlation between a statistical model for a given dataset and local regions in an input image, e.g., relative to the normalized cross correlation between the statistical model and other local regions of the input image.

In executing the segmentation algorithm, system 110 obtains an approximate segmentation of the input image, here denoted as J(x), by computing the normalized cross correlation of input image 111 against each filter in filter bank 106. Based on the normalized cross correlation, system 110 generates an approximate segmentation of the input image. In this example, each filter in filter bank 106 is represented as $W_p(x)$, with p=1, ..., K. In accordance with this representation of the filters, system 110 computes quantity $\gamma_p(u)$ in accordance with the formula shown in the below Table 2.

TABLE 2

$$\gamma_p(u) = \frac{\Sigma_x J(x) W_p(x-u)}{\bar{J}(u) \bar{W}_p}.$$

In the above Table 2, $\bar{J}(u)$ represents the sum of squared values of image J under the template positioned at pixel position u, and $\bar{W}_p$ the sum of squared values of template p. Pixel position u is the pixel position of the input image to be segmented. In this example, system 110 computes a detection probability image M(u) in accordance with the following formula: $M(u) = \max_p \gamma_p(u)$.

In an example, system 110 identifies seeds 120, 121 by finding pixel locations (e.g., in detection probability image M) that are greater than a threshold μ. System 110 also selects seeds to promote a threshold distance among the seeds (e.g., the seeds selected from detection probability image M are not too close to each other). In this example, system 110 searches the detection probability image M for a first highest response, e.g., pixel locations with increased values relative to the values of other pixel locations. System 110 also searches detection probability image M for a second highest response, which is at least a distance r from the first highest response. In this example, the second highest response includes pixel locations with values that are less than the values of the first highest response but are greater than values of other pixel locations. System 110 also searches detection probability image M for third highest responses, which are at least distance r from the first highest response and the second highest response.

System 110 repeats the above-described process of selecting highest responses, until all pixels in the detection probability image M have been investigated. In an example, a detected pixel in M has an associated best match from filter bank 106. Accordingly, implementation of the segmentation algorithm provides the location of a nucleus in input image 111 and the shape of the nucleus in the input image.

Following selection of seeds 120, 121, system 110 segments input image 111 to identify nuclei (when nuclei are the objects being segmented) on input image 111. To segment input image 111, system 110 spatially registers seeds 120, 121 to structures 126, 128 in input image 111. System 110 performs the spatial registration by re-executing the segmentation algorithm to identify a maximization of the normalized cross correlation between the seeds 120, 121 and structures 126, 128. Segmentations 122, 124 of input image 111 represent these spatial registrations of seeds 120, 121 to structures 126, 128.

In this example, segmentations 122, 124 provide a visual indicator of portions of input image 111 that correspond to representations 126, 128. Segmentations 122, 124 also provide a visual indicator of the shape of nuclei shown in representations 126, 128. Segmentation 122 is based on execution of the segmentation algorithm to input image 111 and seed 121. Segmentation 124 is based on execution of the segmentation algorithm to input image 111 and seed 120.

In the example of FIG. 1, system 110 identifies nuclei in representations 126, 128 through numerous segmentations, including, e.g., segmentations 122, 124. The fact that two segmentations 122, 124 are associated with representations 126, 128 strengthens an accuracy of the prediction generated by system 110 that representations 126, 128 are representations of nuclei. In this example, rather than optimizing seeds 120, 121 to input image 111 in parallel, system 110 separately segments each nucleus displayed in input image 111.

In input image 111, nuclei 126, 128 overlap with each other. In an example, system 110 is configured to segment two (or more) nuclei together (e.g., under the same sub-window) if the seeds (e.g., seeds 120, 121) obtained in the above-described technique for generating seeds are less than three pixels apart. In this example, system 110 is configured for joint segmentation, e.g., as illustrated by segmentations 122, 124.

Figure 2A:
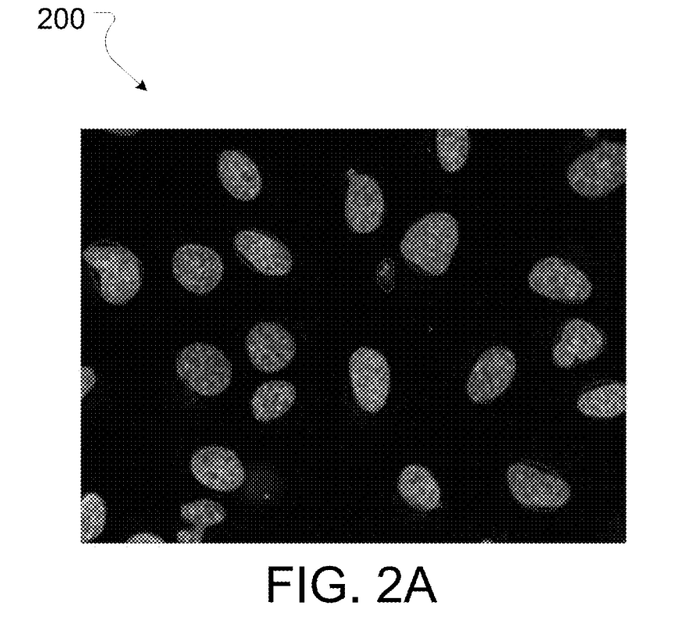
FIG. 2A shows a U2OS cell image with detection results.
Figure 2B:
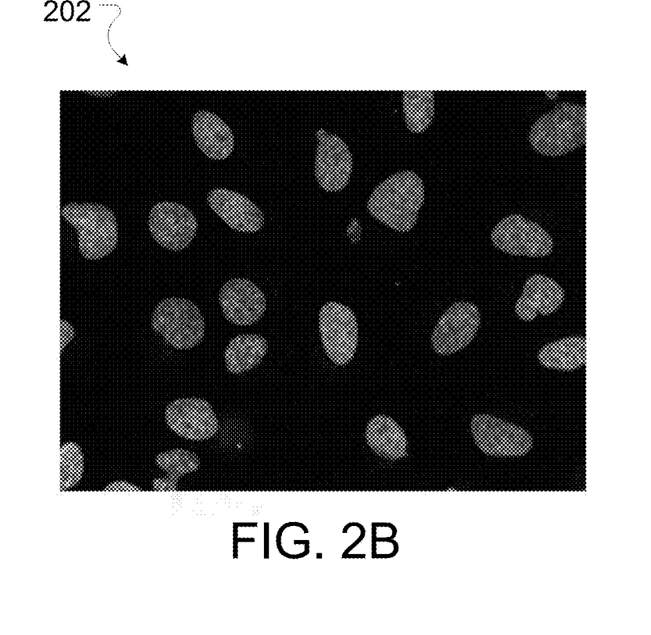
FIG. 2B shows the U2OS cell image with segmentation results.

In an example, system 110 applies the segmentation algorithm to three different datasets, namely, nuclei of U2OS cells dataset, nuclei of NIH3T3 cell dataset, and a synthetic nuclei dataset, as described below with regard to FIGS. 2-4. Referring to FIG. 2A, image 200 shows the approximate result after detection is performed, by system 110, on the U2OS cells dataset using filter bank 106. Referring to FIG. 2B, image 202 shows a final result after accurate segmentation via non-rigid registration is performed, by system 110, on the U2OS cells dataset.

Figure 3A:
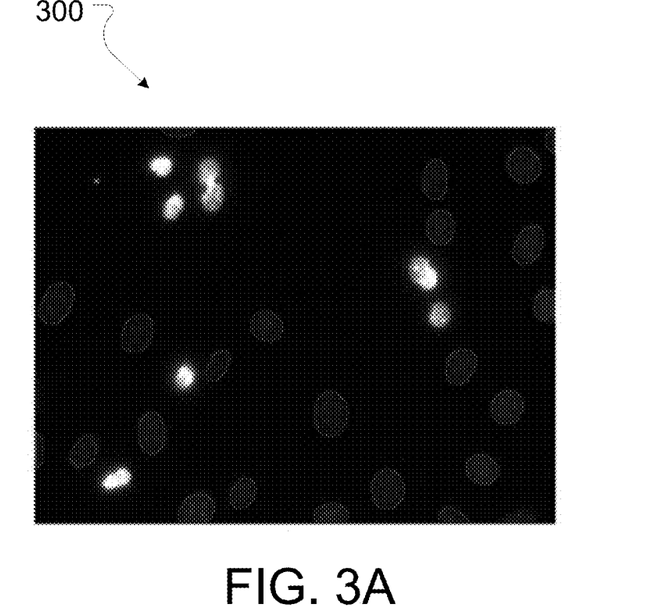
FIG. 3A shows a NIH3T3 cell image with detection results.
Figure 3B:
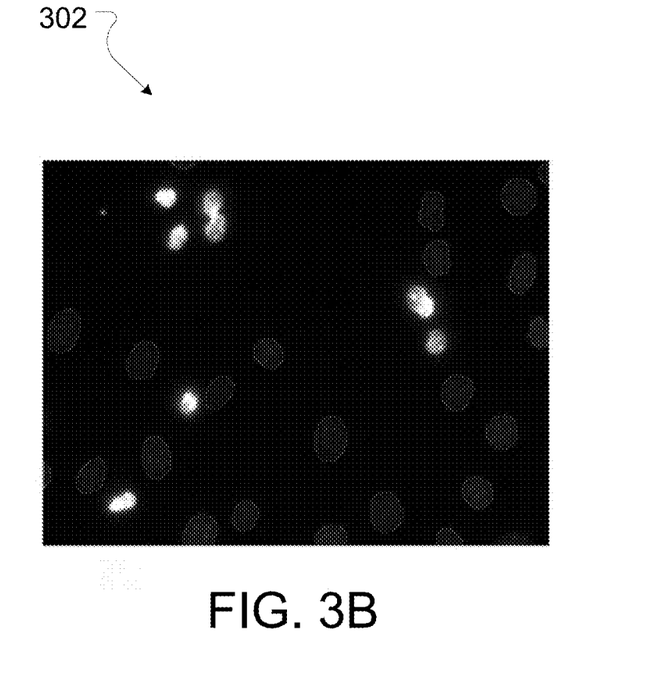
FIG. 3B shows a NIH3T3 cell image with segmentation results.

Referring to FIG. 3A, image 300 shows results of performance by system 110 of detection of structures in an NIH3T3 image, e.g., using filter bank 106. Referring to FIG. 3B, image 302 shows the segmentation results on the NIH3T3 image, e.g., following execution of segmentation process 118. As shown in FIGS. 3A, 3B, the NIH3T3 image exhibits a non-uniform amount of signal intensity emanating from each nucleus. Even with the large variations of brightness in the NIH3T3 image, system 110 is still able to perform segmentation to identify the various nuclei in the NIH3T3 image.

Figure 4A:
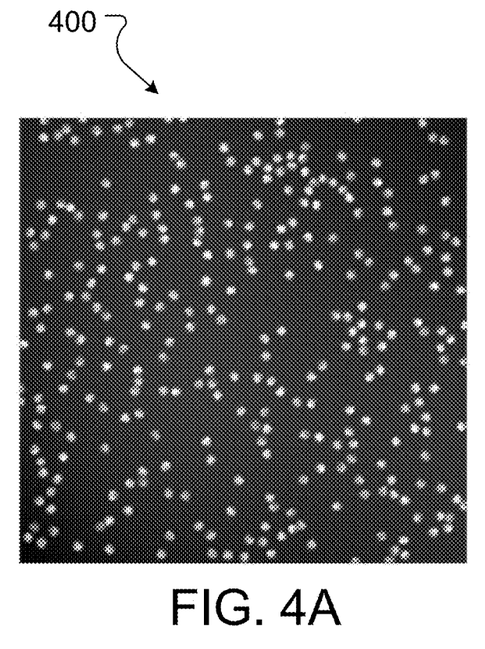
FIG. 4A shows a synthetic cell image with detection results.
Figure 4B:
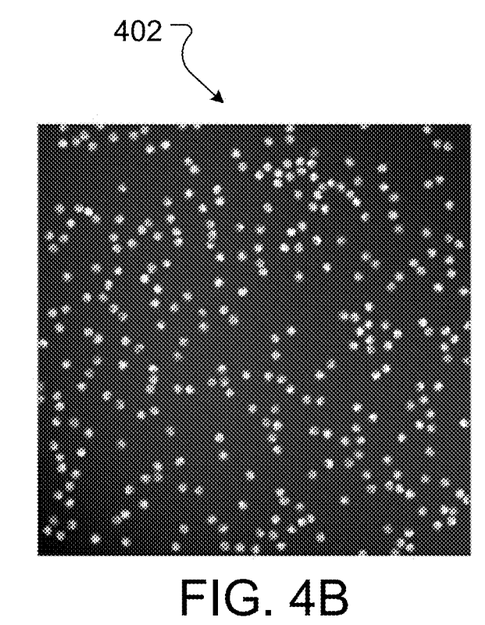
FIG. 4B shows the synthetic cell image with segmentation results.

In another example, system 110 applies the segmentation algorithm to synthetic nuclei data, e.g., to test capability of system 110 for dealing with clustered nuclei, as shown in images 400, 402 in FIGS. 4A, 4B. Image 400 (FIG. 4A) illustrates results of detection of nuclei in the synthetic nuclei data, e.g., based on application by system 110 of the segmentation algorithm to filter bank 106 and the synthetic nuclei data. Referring to FIG. 4B, image 402 shows result of accurate segmentation e.g., based on application by system 110 of the segmentation algorithm to seeds identified through use of filter bank 106 and the synthetic nuclei data. As shown in images 400, 402, even with many clustering nuclei inside the image, system is still able to perform segmentation with a threshold level of accuracy.

Figure 5:
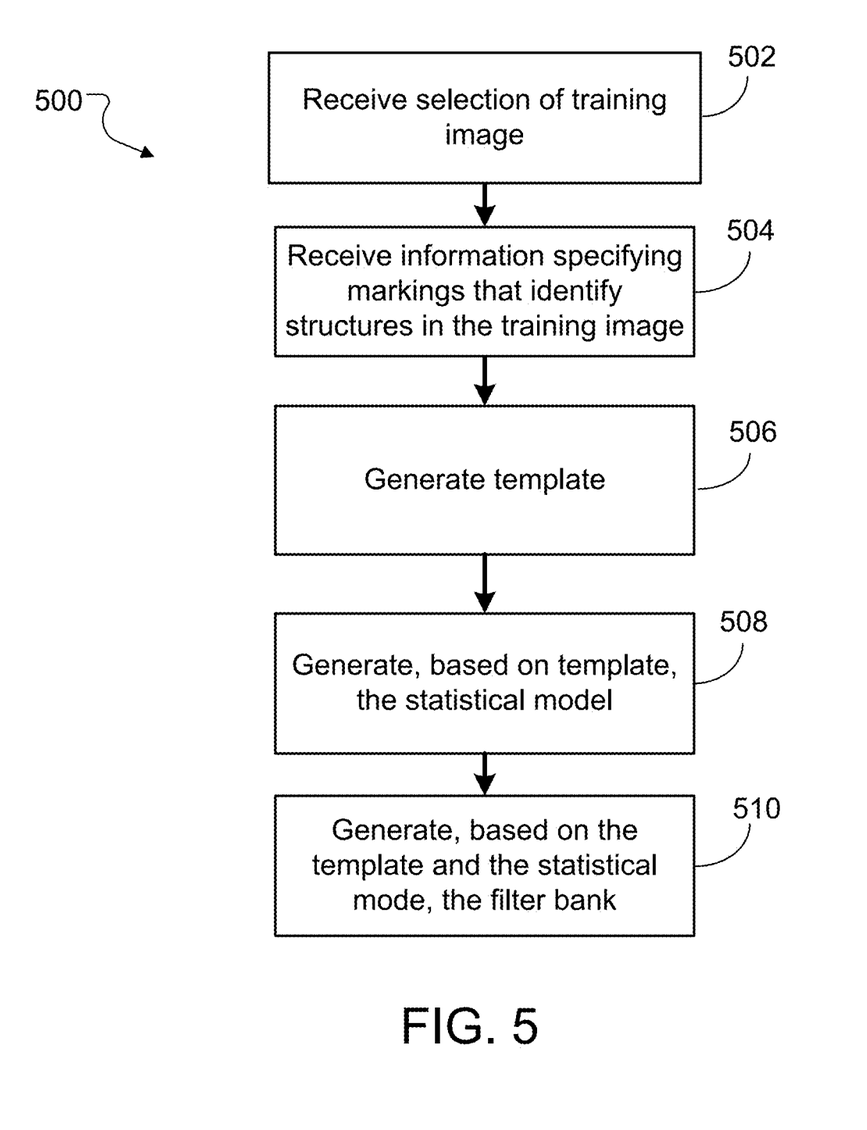
FIG. 5 is a flowchart of a process for generating a filter bank.

FIG. 5 is a flowchart of process 500 for generating a filter bank, including, e.g., filter bank 106. In operation, system 110 receives (502), from a user of client device 102, selection of a training image, including, e.g., training image 109. In response, system 110 prompts the user for information identifying structures (e.g., nuclei) in training image 109. System 110 receives (504), from client device 102, information identifying structures (e.g., nuclei) in training image 109. In an example, the information received includes delineation 107 and other rectangular image sub-windows, with each sub-window including one nucleus.

Using the information identifying the structures in training image 109, system 110 generates (506) a template. For example, as described above, system 110 generates the template by implementing an averaging procedure that includes taking the several windows each including one image of a structure (e.g., nucleus) and registering the images non-rigidly to find an average spatial configuration among the structures. System 110 averages the pixel intensities of the images included in the set and uses the resultant pixel intensity as the pixel intensity of the template.

Using the template, system 110 generates (508) a statistical model of spatial transformations representing possible variations in the shape of the sample nuclei that were marked in training image 109. As described above, the statistical model includes a spatial transformation that is encoded as a vector (i.e., v) of displacements in accordance with the following formula: $v_i = [T_i(x_1), \ldots, T_i(x_M)]^T$, with M representing the number of pixels in an image. In this example, system 110 computes the mean and the covariance of the set of spatial displacements $v_1, \ldots, v_N$ in accordance with the formulas shown in the above Table 1.

In the example of FIG. 5, system 110 generates (510) filter bank 106 using the statistical model. As described above, system 110 evaluates the statistical model for $b \in [-3\lambda_k, 3\lambda_k]$, in intervals of $\lambda$. Using results of the evaluation, system 110 generates an initial set of images representing likely nuclear configurations. In an example, the initial set of images is included in filter bank 106. Additionally, system 110 may augment the initial set of images by including in filter bank 106 additional images that represent rotations of one or more images in the initial set. System 110 may also augment the initial set of images by including in filter bank 106 additional images that represent variations in size of one or more images in the initial set.

Figure 6:
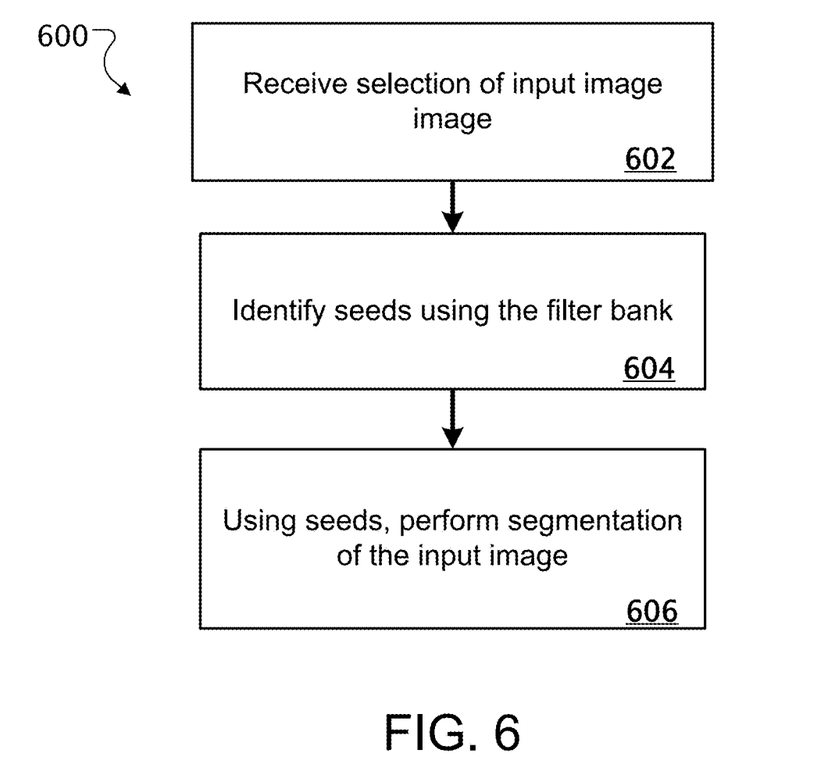
FIG. 6 is a flowchart of a process for segmenting an input image.

FIG. 6 is a flowchart of process 600 for generating segmentations 122, 124 of an input image, including, e.g., input image 111. In operation, system 110 receives (602), from the user of client device 102, a selection of input image 111, e.g., from data set 104. In response, system 110 identifies (604) seeds 120, 121 for input image 111, e.g., using filter bank 106. For example, as described above, each filter in filter bank 106 is represented as $W_p(x)$, with $p=1, \ldots, K$. In accordance with this representation of the filters, system 110 computes quantity $\gamma_p(u)$ in accordance with the formula shown in the above Table 2. Using quantity $\gamma_p(u)$, system 110 computes a detection probability image M(u) in accordance with the following formula: $M(u)=\max_p \gamma(u)$. In an example, system 110 identifies seeds 120, 121 by finding pixel locations (e.g., in detection probability image M) that are greater than a threshold $\mu$.

Using the seeds, system 110 performs (606) segmentation of input image 111, e.g., to generate segmentations 122, 124. As described above, to segment input image 111, system 110 spatially registers seeds 120, 121 to structures 126, 128 in input image 111. System 110 performs the spatial registration by re-executing the segmentation algorithm to identify a maximization of the normalized cross correlation between the seeds 120, 121 and structures 126, 128. Segmentations 122, 124 of input image 111 represent these spatial registrations of seeds 120, 121 to structures 126, 128.

Using the techniques described herein, system 110 is configured to segment biological structures (e.g., cells, sub-cellular organelles, and so forth) from microscopy images. System 110 performs the segmentation based on a supervised learning technique that generates a template from a training image. Using the template, system 110 identifies structures in other images that are similar to those structures identified in the template.

Figure 7:
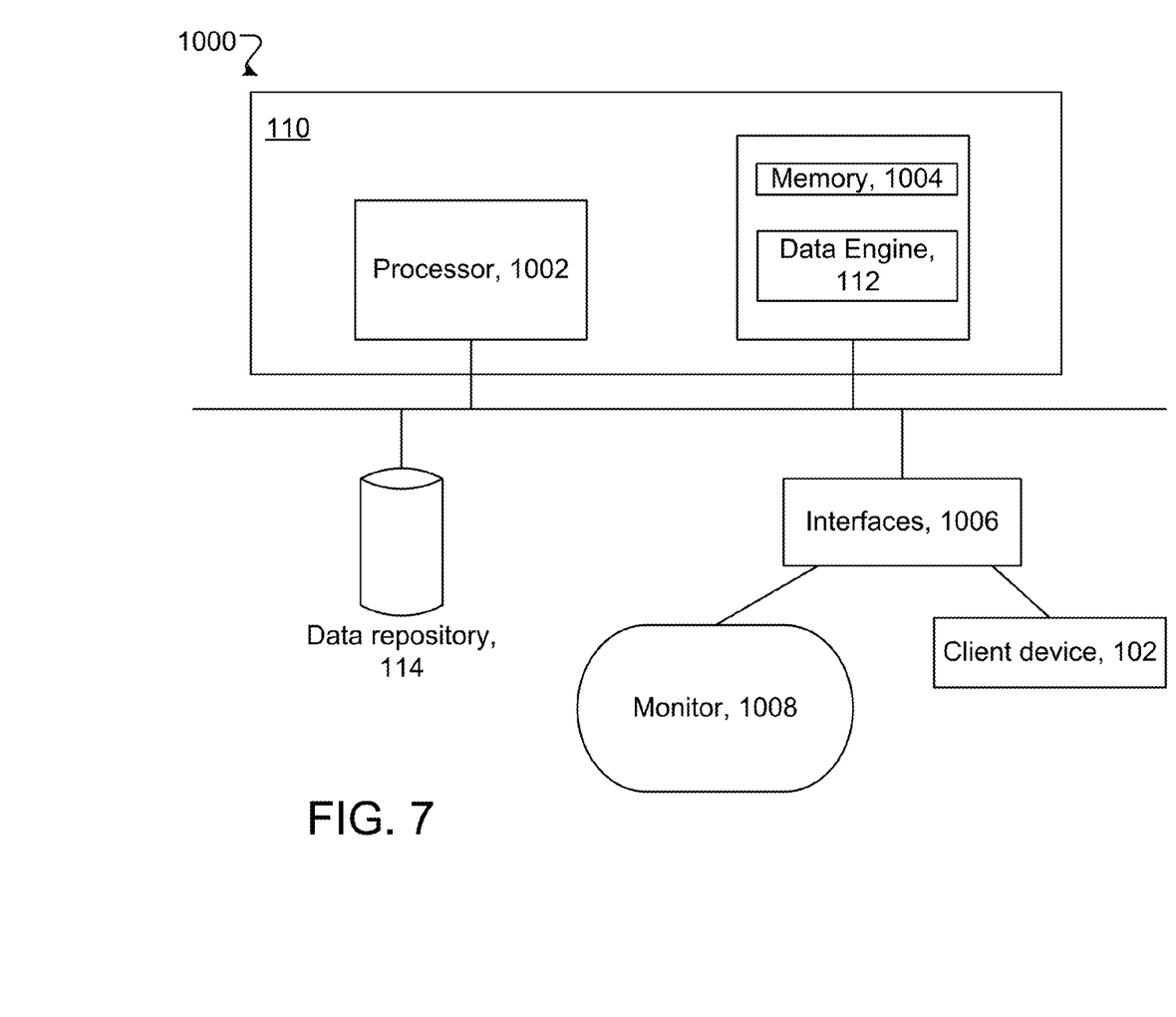
FIG. 7 is a block diagram of components in an example environment for segmenting an image with a template.

Referring to FIG. 7, components 1000 of an environment (e.g., environment 100) are shown. Client device 102 can be any sort of computing device capable of taking input from a user and communicating over a network (not shown) with server 110 and/or with other client devices. For example, client device 102 can be a mobile device, a desktop computer, a laptop, a cell phone, a personal digital assistant ("PDA"), a server, an embedded computing system, a mobile device and so forth. Client device 102 can include monitor 1108, which renders visual representations of interface 1106.

Server 110 can be any of a variety of computing devices capable of receiving data, such as a server, a distributed computing system, a desktop computer, a laptop, a cell phone, a rack-mounted server, and so forth. Server 110 may be a single server or a group of servers that are at a same location or at different locations.

Server 110 can receive data from client device 102 via interfaces 1106, including, e.g., graphical user interfaces. Interfaces 1106 can be any type of interface capable of receiving data over a network, such as an Ethernet interface, a wireless networking interface, a fiber-optic networking interface, a modem, and so forth. Server 110 also includes a processor 1002 and memory 1004. A bus system (not shown), including, for example, a data bus and a motherboard, can be used to establish and to control data communication between the components of server 110. In the example of FIG. 10, memory 1004 includes system 110.

Processor 1002 may include one or more microprocessors. Generally, processor 1002 may include any appropriate processor and/or logic that is capable of receiving and storing data, and of communicating over a network (not shown). Memory 2244 can include a hard drive and a random access memory storage device, such as a dynamic random access memory, machine-readable media, or other types of non-transitory machine-readable storage devices.

Components 1000 also include data repository 114, which is configured to store data collected through server 110 and generated by server 110.

Embodiments can be implemented in digital electronic circuitry, or in computer hardware, firmware, software, or in combinations thereof. Apparatus of the invention can be implemented in a computer program product tangibly embodied or stored in a machine-readable storage device and/or machine readable media for execution by a programmable processor; and method actions can be performed by a programmable processor executing a program of instructions to perform functions and operations of the invention by operating on input data and generating output.

The techniques described herein can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Computer readable storage media are storage devices suitable for tangibly embodying computer program instructions and data include all forms of volatile memory such as RAM and non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

In another example, due to the nature of software, functions described above can be implemented using software, hardware, firmware, hardwiring, or combinations of any of these. Features implementing functions may also be physically located at various positions, including being distributed such that portions of functions are implemented at different physical locations.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by one or more processors, comprising:
   receiving an image to be segmented into one or more representations of one or more biological structures;
   accessing data representing a set of biological structures that are derived from other biological structures delineated in a training image, wherein the training image is associated with a level of modality that corresponds to a level of modality associated with the image to be segmented;

computing a normalized cross correlation of the received image against one or more of the biological structures in the set of biological structures;

generating, based on computing, seed data representing an estimate of a spatial organization of the one or more biological structures in the received image; and segmenting, based on a normalized cross correlation of the received image to the seed data, the received image into the one or more representations of the one or more biological structures.

2. The method of claim 1, wherein segmenting comprises:
using the normalized cross correlation of the received image to the seed data to spatially register one or more items of seed data to the one or more biological structures in the received image.

3. The method of claim 1, wherein generating comprises:
computing quantity $\gamma_p(u)$ in accordance with:

$$\gamma_p(u) = \frac{\sum_x J(x) W_p(x-u)}{\overline{J}(u)\overline{W}_p}$$

wherein J(x) represents an approximate segmentation of the received image;

wherein each biological structure in the set of biological structures is represented as $W_p(x)$, with p=1, ..., K;

wherein $\overline{J}(u)$ represents a sum of squared values of image J under a template positioned at u;

wherein $\overline{W}_p$ represent a sum of squared values of a template p; and wherein the method further comprises:
computing a detection probability image M(u) in accordance with M(u)=$\max_p \gamma(u)$; and
identifying the seed data based on identification of pixel locations in detection probability image M that are greater than a threshold μ.

4. The method of claim 1, wherein the received image comprises a microscopy image.

5. The method of claim 1, wherein the one or more biological structures in the received image comprise one or more of a nucleus, a cell, a tissue, and an organ.

6. The method of claim 1, further comprising:
receiving the training image; and
receiving data specifying a delineation of biological structures in the training image.

7. The method of claim 6, further comprising:
generating, based on the delineation, a template representing a biological structure that is derived from features of the delineated biological structures;
applying a principal component analysis technique to the template and to variations of the template;
generating, based on application of the principal component analysis technique, a statistical model of spatial transformations representing possible variations in shape of the delineated biological structures in the training image; and
generating, based on application of the statistical model to the delineated biological structures in the received image, the set of biological structures.

8. The method of claim 1, wherein the one or more biological structures represented in the received image comprises at least one of:
a nucleus of a U2OS cell;
a nucleus of a NIH3T3 cell; and
a nucleus of a synthetic cell.

9. One or more non-transitory machine-readable media configured to store instructions that are executable by one or more processors to perform operations comprising:
receiving an image to be segmented into one or more representations of one or more biological structures;
accessing data representing a set of biological structures that are derived from other biological structures delineated in a training image, wherein the training image is associated with a level of modality that corresponds to a level of modality associated with the image to be segmented;
computing a normalized cross correlation of the received image against one or more of the biological structures in the set of biological structures;
generating, based on computing, seed data representing an estimate of a spatial organization of the one or more biological structures in the received image; and
segmenting, based on a normalized cross correlation of the received image to the seed data, the received image into the one or more representations of the one or more biological structures.

10. The one or more non-transitory machine-readable media of claim 9, wherein segmenting comprises:
using the normalized cross correlation of the received image to the seed data to spatially register one or more items of seed data to the one or more biological structures in the received image.

11. The one or more non-transitory machine-readable media of claim 9, wherein generating comprises:
computing quantity $\gamma_p(u)$ in accordance with:

$$\gamma_p(u) = \frac{\sum_x J(x) W_p(x-u)}{\overline{J}(u)\overline{W}_p}$$

wherein J(x) represents an approximate segmentation of the received image;

wherein each biological structure in the set of biological structures is represented as $W_p(x)$, with p=1, ..., K;

wherein $\overline{J}(u)$ represents a sum of squared values of image J under a template positioned at u;

wherein $\overline{W}_p$ represent a sum of squared values of a template p; and wherein the method further comprises:
computing a detection probability image M(u) in accordance with M(u)=$\max_p \gamma(u)$; and
identifying the seed data based on identification of pixel locations in detection probability image M that are greater than a threshold μ.

12. The one or more non-transitory machine-readable media of claim 9, wherein the received image comprises a microscopy image.

13. The one or more non-transitory machine-readable media of claim 9, wherein the one or more biological structures in the received image comprise one or more of a nucleus, a cell, a tissue, and an organ.

14. The one or more non-transitory machine-readable media of claim 9, wherein the operations further comprise:

receiving the training image; and receiving data specifying a delineation of biological structures in the training image.

15. The one or more non-transitory machine-readable media of claim 14, wherein the operations further comprise:

generating, based on the delineation, a template representing a biological structure that is derived from features of the delineated biological structures;

applying a principal component analysis technique to the template and to variations of the template;

generating, based on application of the principal component analysis technique, a statistical model of spatial transformations representing possible variations in shape of the delineated biological structures in the training image; and generating, based on application of the statistical model to the delineated biological structures in the received image, the set of biological structures.

16. The one or more non-transitory machine-readable media of claim 9, wherein the one or more biological structures represented in the received image comprises at least one of:

a nucleus of a U2OS cell;

a nucleus of a NIH3T3 cell; and a nucleus of a synthetic cell.

17. An electronic system comprising:

one or more processors; and one or more machine-readable media configured to store instructions that are executable by the one or more processors to perform operations comprising:

receiving an image to be segmented into one or more representations of one or more biological structures;

accessing data representing a set of biological structures that are derived from other biological structures delineated in a training image, wherein the training image is associated with a level of modality that corresponds to a level of modality associated with the image to be segmented;

computing a normalized cross correlation of the received image against one or more of the biological structures in the set of biological structures;

generating, based on computing, seed data representing an estimate of a spatial organization of the one or more biological structures in the received image; and segmenting, based on a normalized cross correlation of the received image to the seed data, the received image into the one or more representations of the one or more biological structures.

18. The electronic system of claim 17, wherein segmenting comprises:

using the normalized cross correlation of the received image to the seed data to spatially register one or more items of seed data to the one or more biological structures in the received image.

19. The electronic system of claim 17, wherein generating comprises:

computing quantity $\gamma_p(u)$ in accordance with:

$$\gamma_p(u) = \frac{\sum_x J(x) W_p(x-u)}{\overline{J}(u) \overline{W}_p}$$

wherein J(x) represents an approximate segmentation of the received image;

wherein each biological structure in the set of biological structures is represented as $W_p(x)$, with p=1, ..., K;

wherein $\overline{J}(u)$ represents a sum of squared values of image J under a template positioned at u;

wherein $\overline{W}_p$ represent a sum of squared values of a template p; and wherein the method further comprises:

computing a detection probability image M(u) in accordance with $M(u)=\max_p \gamma(u)$; and identifying the seed data based on identification of pixel locations in detection probability image M that are greater than a threshold μ.

20. The electronic system of claim 17, wherein the received image comprises microscopy image.

21. The electronic system of claim 17, wherein the one or more biological structures in the received image comprise one or more of a nucleus, a cell, a tissue, and an organ.

22. The electronic system of claim 17, wherein the operations further comprise:

receiving the training image; and receiving data specifying a delineation of biological structures in the training image.

23. The one electronic system of claim 22, wherein the operations further comprise:

generating, based on the delineation, a template representing a biological structure that is derived from features of the delineated biological structures;

applying a principal component analysis technique to the template and to variations of the template;

generating, based on application of the principal component analysis technique, a statistical model of spatial transformations representing possible variations in shape of the delineated biological structures in the training image; and generating, based on application of the statistical model to the delineated biological structures in the received image, the set of biological structures.

24. The electronic system of claim 17, wherein the one or more biological structures represented in the received image comprises at least one of:

a nucleus of a U2OS cell;

a nucleus of a NIH3T3 cell; and a nucleus of a synthetic cell.

* * * * *

UNITED STATES PATENT AND TRADEMARK OFFICE
CERTIFICATE OF CORRECTION

PATENT NO. : 9,443,128 B2  Page 1 of 1
APPLICATION NO. : 14/348342
DATED : September 13, 2016
INVENTOR(S) : Cheng Chen et al.

It is certified that error appears in the above-identified patent and that said Letters Patent is hereby corrected as shown below:

On the Title Page

Column 2 (Abstract), Line 14, delete "correction" and insert -- correlation --

In the Claims

Column 16, Line 34, Claim 23, after "The" delete "one"

Signed and Sealed this
Twenty-fourth Day of January, 2017

Michelle K. Lee
*Director of the United States Patent and Trademark Office*